(12) United States Patent
Asakura et al.

(10) Patent No.: US 8,210,132 B2
(45) Date of Patent: Jul. 3, 2012

(54) LATENT HEAT RECOVERY-TYPE WATER HEATER

(75) Inventors: Hiroshi Asakura, Hyogo (JP); Shigehiro Yamamoto, Hyogo (JP); Masamitu Ishikado, Hyogo (JP)

(73) Assignee: Noritz Corporation, Hyogo (JP)

( * ) Notice: Subject to any disclaimer, the term of this patent is extended or adjusted under 35 U.S.C. 154(b) by 896 days.

(21) Appl. No.: 12/292,410

(22) Filed: Nov. 19, 2008

(65) Prior Publication Data

US 2009/0133642 A1    May 28, 2009

(30) Foreign Application Priority Data

Nov. 22, 2007    (JP) ................................. 2007-302744

(51) Int. Cl.
*F22B 1/02*    (2006.01)
(52) U.S. Cl. ....... 122/18.1; 122/33; 237/19; 165/104.14
(58) Field of Classification Search ................. 122/18.1, 122/31.1, 32, 33; 165/104.14, 104.19, 104.22; 237/8 R, 16, 19
See application file for complete search history.

(56) References Cited

U.S. PATENT DOCUMENTS

| | | | | |
|---|---|---|---|---|
| 4,482,004 A * | 11/1984 | Grover | ............................. | 165/47 |
| 6,345,769 B2 * | 2/2002 | MacIntyre | .................... | 237/8 R |
| 6,427,638 B1 * | 8/2002 | Kolbusz et al. | .............. | 122/15.1 |
| 6,662,758 B1 * | 12/2003 | Shin | .............................. | 122/18.1 |
| 6,971,335 B2 * | 12/2005 | Kobayashi et al. | ............. | 122/32 |
| 7,322,532 B2 * | 1/2008 | Takada et al. | .................... | 236/11 |
| 7,458,340 B2 * | 12/2008 | Takeda et al. | ................. | 122/31.1 |
| 7,647,897 B2 * | 1/2010 | Ootomo et al. | .................. | 122/33 |

FOREIGN PATENT DOCUMENTS

JP    11-148642 A    6/1999

* cited by examiner

*Primary Examiner* — Gregory A Wilson
(74) *Attorney, Agent, or Firm* — Rader, Fishman & Grauer PLLC

(57) ABSTRACT

So as to provide a latent heat recovery-type water heater capable of certainly preventing drain generated by heat exchange from being discharged out of an exhaust portion through an outlet with entrained by a flow of combustion gas, an exhaust portion 9 is formed by an exhaust portion constituting-body 25 attached above a secondary heat exchanger 7. The exhaust portion 9 includes therewithin a deflector 26 and a distribution board 27 opposed to the deflector 26. The deflector 26 has a deflection board 30 extending substantially vertically downward from a top face 9a of the exhaust portion 9, so as to form a gap 35 between a lower end of the board 30 and a bottom face 9b of the exhaust portion 9. A flowing direction of combustion gas introduced into the exhaust portion 9 through an opening 21 of the bottom face 9b is deflected by passing through the gap 35, and the combustion gas flows toward the distribution board 27. The combustion gas hits on the distribution board 27 to be distributed within the exhaust portion 9, thereafter being discharged through an exhaust opening 23.

18 Claims, 6 Drawing Sheets

LATENT HEAT RECOVERY-TYPE WATER HEATER

BACKGROUND OF THE INVENTION

1. Field of the Invention

The present invention relates to a latent heat recovery-type water heater capable of recovering not only sensible heat but also latent heat contained in combustion gas. Herein, in the present application, the term "water" includes cold water and hot water, if not otherwise specified.

2. Description of Related Art

Conventionally, a latent heat recovery-type water heater as disclosed in the below-identified patent document has been provided. Such a kind of water heater uses excellent and expensive anticorrosive materials as materials of members such as a heat exchanger due to a strong acidity resulting from drain, which is generated by recovering latent heat and exposed to combustion gas.

Patent Document 1: JP 11-148642A

SUMMARY OF THE INVENTION

Problems to be Solved by the Invention

Herein, the above-mentioned latent heat recovery-type water heater may be arranged in such a manner that a combustion gas inlet is formed on one face (upstream face) and a combustion gas outlet is formed on another face (downstream face) opposed to the one face, the faces defining an exhaust portion located downstream of a secondary heat exchanger. In such an arrangement, reduction of the distance between the upstream face and the downstream face so as to reduce volume of the exhaust portion reduces the distance of a combustion gas passage, resulting in such a disadvantage that drain is discharged out of the exhaust portion through the outlet, entrained in the combustion gas.

Though, as described above, in the conventional latent heat recovery-type water heater, members such as a heat exchanger have been made of excellent anticorrosive materials as so as to prevent corrosion caused by drain, other members such as an exhaust piping provided for exhausting combustion gas and connected to the exhaust portion generally have not been made of such excellent anticorrosive materials. Discharge of drain out of the exhaust portion in the above-mentioned way has resulted in such a problem as potential corrosion of the piping or the exhaust portion, which is caused by drain adhered to the exhaust piping or a portion where the piping is connected to the exhaust portion. Further, in order to prevent such corrosion of the members such as the piping, it has been necessary to use excellent and expensive anticorrosive materials as materials for the members such as the piping.

An object of the present invention to solve the problems and drawbacks described above is therefore to provide a latent heat recovery-type water heater capable of preventing drain from being discharged out of an exhaust portion.

Means to Solve the Problems

In order to achieve the object described above, an aspect of the present invention provided herein is a latent heat recovery-type water heater including a burner that generates a combustion gas, a combustion gas passage in which the combustion gas flows, a first heat exchanger disposed in the combustion gas passage and recovering mainly sensible heat contained in the combustion gas, a second heat exchanger disposed downstream of the first heat exchanger in a flowing direction of the combustion gas and recovering mainly latent heat contained in the combustion gas, and an exhaust portion disposed downstream of the second heat exchanger, the exhaust portion being defined by an upstream face having an inlet of the combustion gas having been flowed through the second heat exchanger and a downstream face opposed to the upstream face and having an outlet of the combustion gas, and the exhaust portion having a deflector disposed in a space formed between the upstream face and the downstream face so as to deflect a flow of the combustion gas having been flowed through the inlet in a direction along the upstream and downstream faces.

The latent heat recovery-type water heater of the present aspect includes a deflector in a space within an exhaust portion, whereby a flowing direction of combustion gas having been flowed through an inlet is deflected in a direction along upstream and downstream faces. That prevents the combustion gas having been flowed through the inlet from directly flowing toward an outlet, thereby preventing drain from being discharged out of the exhaust portion through the outlet due to such a reason as entrainment by a flow of the combustion gas.

As described above, the water heater of the present aspect prevents drain from being discharged out of the exhaust portion through the outlet, so as to protect a member such as an exhaust piping connected to the outlet from corrosion. Further, by the above-mentioned configuration, there is no need to leave plenty of space between the upstream face and the downstream face so as to keep a proper length of a combustion gas passage from the inlet to the outlet within the exhaust portion. Consequently, the present aspect renders a compact exhaust portion.

It is recommended that the deflector has at least one cross face perpendicular to the downstream face and extending from the downstream face toward the upstream face with a gap formed between the cross face and the upstream face, and that the cross face divides the exhaust portion into two imaginary parts, the inlet being formed in one of the parts, and the outlet being formed in the other part, so that the combustion gas is discharged through the outlet.

In the water heater of the present aspect, the combustion gas having been flowed through the inlet formed in one part of the exhaust portion, which is divided by the cross section, passes through the gap formed between the cross face and the upstream face, then flowing into the other part of the exhaust portion. Therefore, a flowing direction of the combustion gas is deflected when the gas passes through the gap within the exhaust portion and then the gas is discharged through the outlet. Consequently, the above-mentioned configuration ensures deflecting of a flowing direction of the combustion gas having been flowed through the inlet, thereby preventing drain from being discharged out of the exhaust portion through the outlet with entrained by the combustion gas.

The deflector and the downstream face preferably have no gap therebetween.

The water heater of the invention has the outlet on the downstream face of the exhaust portion. Therefore, it is preferable that the combustion gas just having been flowed into the exhaust portion passes as far from the downstream face as possible so as to prevent drain from being discharged through the outlet. In this view, the water heater of the present aspect is arranged to have no gap between the deflector and the downstream face. Such an arrangement allows the combustion gas just having been flowed into the exhaust portion to pass through the gap formed between the cross face and the upstream face, thereby preventing drain from being discharged out of the exhaust portion through the outlet more certainly.

Herein, if the flow of the combustion gas concentrates in one spot in the exhaust portion, drain may concentrate in the spot. Unfavorable concentration of drain in one spot in this way may discharge the drain out due to exhaust pressure of the combustion gas.

Thus, the exhaust portion preferably has a distributor disposed downstream in a flowing direction of the combustion gas having been deflected by the deflector so that the combustion gas having been flowed through the deflector is distributed in the exhaust portion.

This configuration prevents a flow of the combustion gas and drain from concentrating in one spot in the exhaust portion, thereby preventing discharge of drain more certainly.

Herein, as described above, unfavorable concentration of a flow of the combustion gas and drain in the exhaust portion may discharge the drain out of the spot. In order to ensure prevention of drain from being discharged through the outlet, it is desirable to prevent a flow of the combustion gas from concentrating in a position corresponding to the outlet.

Thus, it is preferable that the distributor has inclined surfaces opposed to the cross face and being inclined toward and away from the cross face, so that the combustion gas makes a hit on the inclined surfaces, the hit deflecting a flowing direction of the combustion gas into a direction away from an imaginary projection area formed by projecting the opening area of the outlet onto the upstream face.

Further, it is preferable that the distributor has a ridge and inclined surfaces extending from the ridge to both sides of the ridge, and that the distributor is positioned so that the ridge projects toward the deflector.

Still further, it is preferable that on assumption of existence of a first plane including the cross face and a second plane perpendicular to the first plane and including a central axis of an opening area of the outlet, the ridge exists on the second plane.

This configuration prevents a flow of the combustion gas from concentrating in the above-mentioned projection area, thereby certainly preventing drain from being discharged through the outlet.

The above-mentioned invention is suitably employed in such a configuration that the upstream face is located above the downstream face, the inlet being arranged so that the combustion gas having been discharged through the second heat exchanger is introduced upward with respect to the upstream face, and the outlet being arranged so that the combustion gas existing in the exhaust portion is discharged upward with respect to the downstream face.

The present invention provides the latent heat recovery-type water heater capable of certainly preventing drain generated by heat exchange from being discharged out of the exhaust portion with entrained by a flow of the combustion gas.

DESCRIPTION OF THE PREFERRED EMBODIMENT

Figure 1:
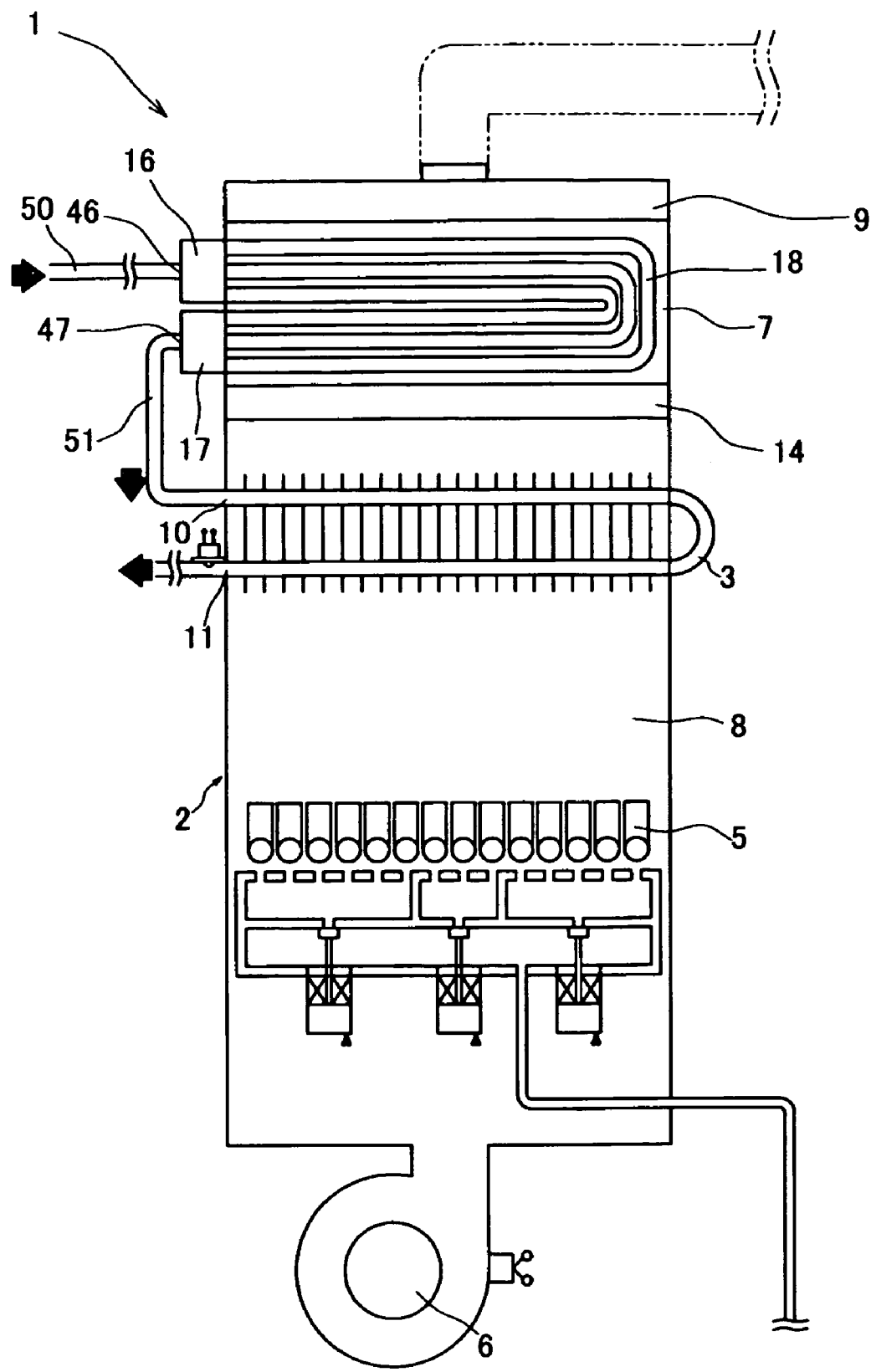
FIG. 1 is a schematic diagram of a water heater of an embodiment of the present invention.

Now, a latent heat recovery-type water heater 1 (hereinafter referred to as a water heater 1) of an embodiment of the present invention will be described below in detail, making reference to the accompanying drawings. As shown in FIG. 1, the water heater 1 mainly consists of a shell 2 provided with a primary heat exchanger (first heat exchanger) 3 for mainly recovering sensible heat contained in combustion gas, a secondary heat exchanger (second heat exchanger) 7 for mainly recovering latent heat contained in combustion gas, a burner (combustion means) 5, a fan 6, and an exhaust portion 9. The secondary heat exchanger 7 is located downstream of the primary heat exchanger 3, that is, at an upper part in FIG. 1. The exhaust portion 9 is located downstream in a flow direction of the combustion gas, that is, above the secondary heat exchanger 7.

The primary heat exchanger 3 is designed to carry out heat exchange with the combustion gas flowing in a combustion gas passage 8 in the shell 2 incorporating the burner 5. The primary heat exchanger 3 is a so-called fin-and-tube heat exchanger whose main part is made of copper. The primary heat exchanger 3 is located within the combustion gas passage 8 in which high-temperature combustion gas generated by the burner 5 flows. The primary heat exchanger 3 functions as a sensible heat recovery means for mainly recovering sensible heat contained in combustion gas, being designed to heat water flowing therein.

The primary heat exchanger 3 has a water inlet 10 and a water outlet 11. The water inlet 10 is connected to a water outlet 47 of the secondary heat exchanger 7 described below, so that water having undergone heat exchange by the secondary heat exchanger 7 flows into the primary heat exchanger 3. The water outlet 11 is connected to a load terminal of a device such as a heater or a hot-water tap, both not shown.

Figure 2:
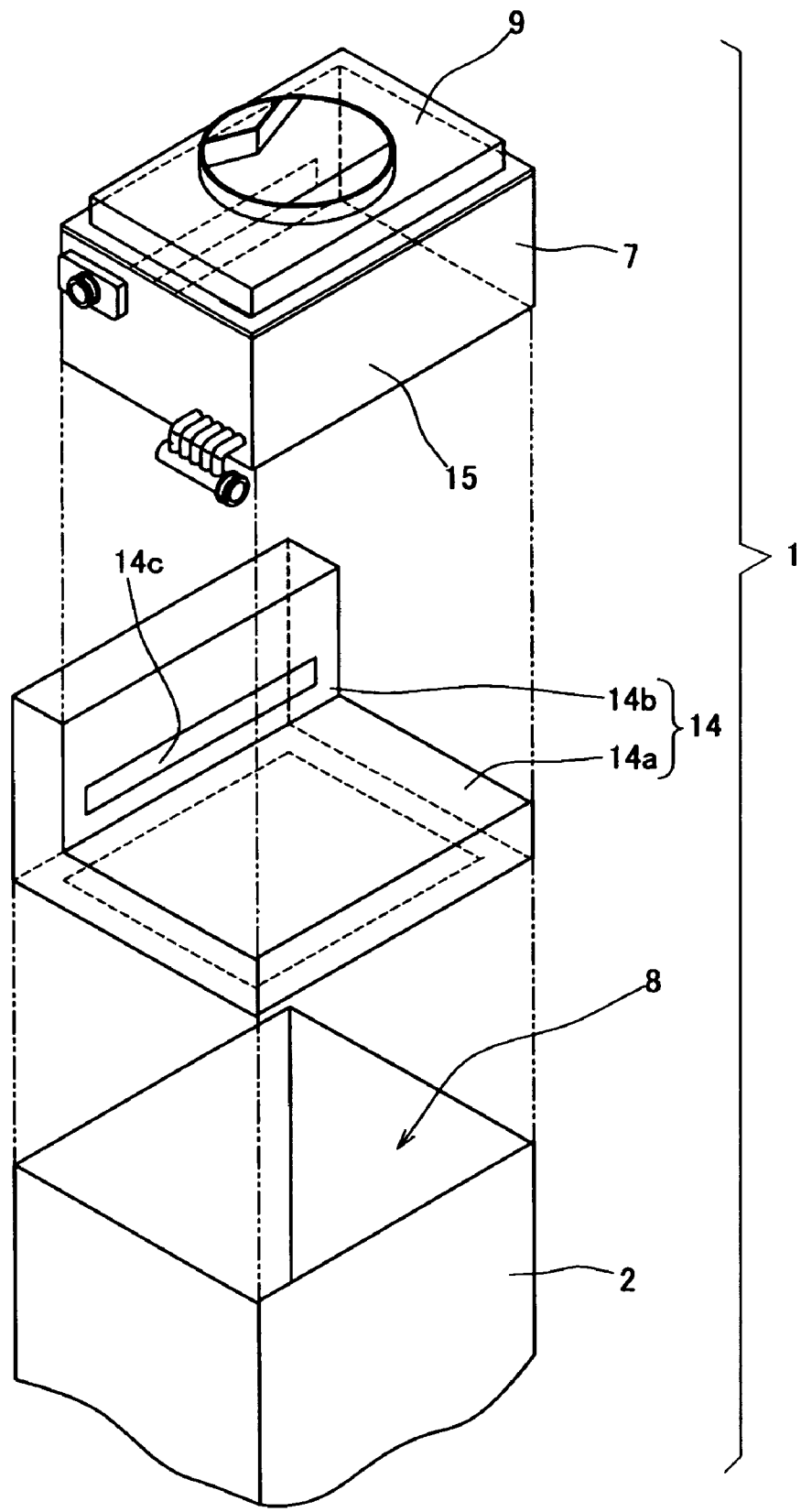
FIG. 2 is an exploded perspective view showing a configuration in the vicinity of an exhaust portion of the water heater shown in FIG. 1.

Referring to FIGS. 1 and 2, the secondary heat exchanger 7 is connected to the shell 2 via a connecting member 14. The connecting member 14, as shown in FIG. 2, mainly consists of a converging portion 14a connected to an opening of the shell 2 and a connecting portion 14b, the portions 14a and 14b being combined in substantially an L shape so as to form a communicating passage in the portions 14a and 14b. The connecting portion 14b is in plane contact with a rear face of a casing 15 of the secondary heat exchanger 7 to be airtight and has an opening 14c through which combustion gas is introduced into the casing 15.

Figure 3:
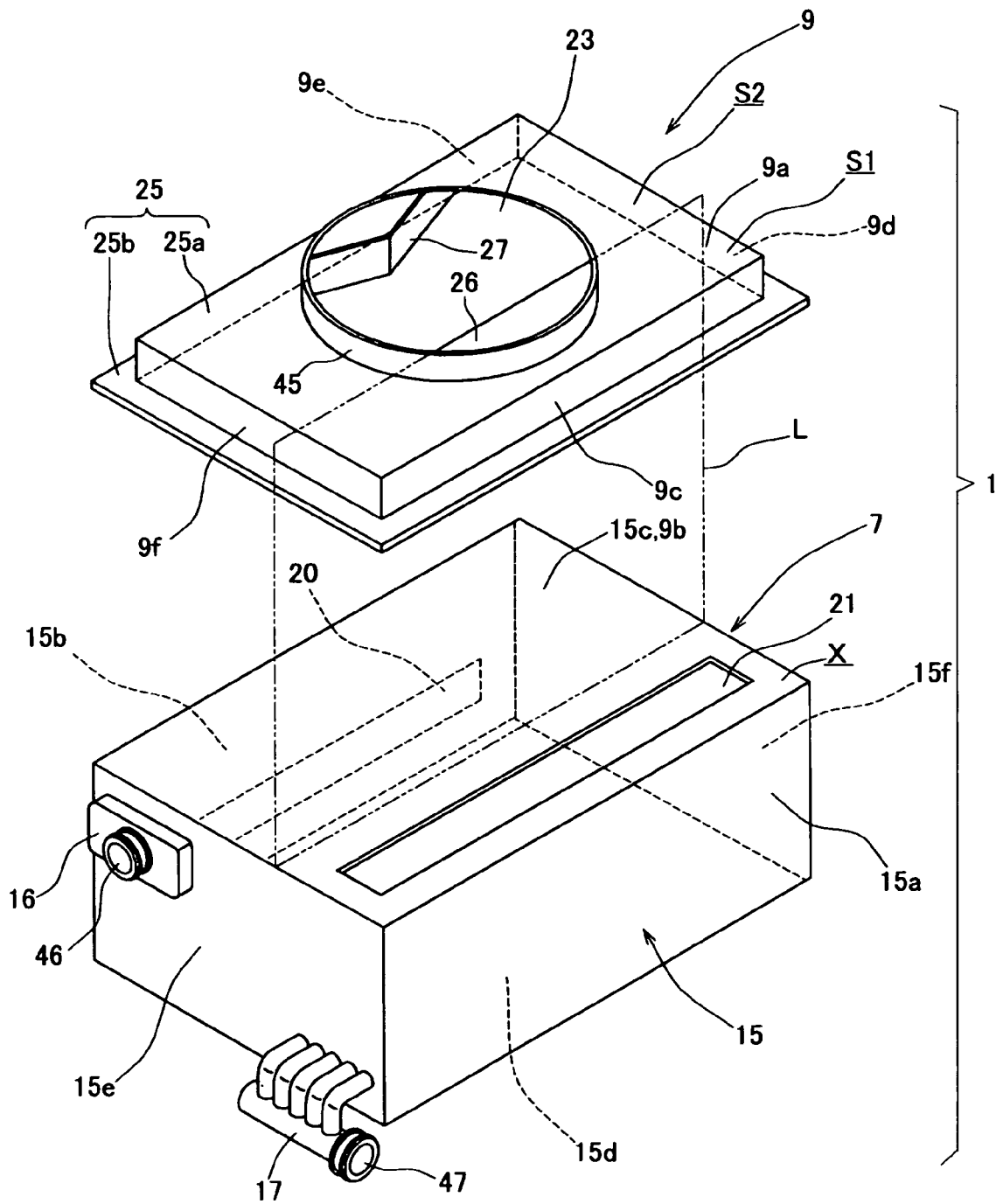
FIG. 3 is an exploded perspective view of a secondary heat exchanger and the exhaust portion.

The secondary heat exchanger 7 is a so-called multitubular heat exchanger, which includes a number of heat receiving tubes 18 arranged within the casing 15. As shown in FIG. 3, the secondary heat exchanger 7 has the casing 15 of a hollow rectangular parallelepiped shape surrounded by a front face 15a, a rear face 15b, a top face 15c, a bottom face 15d, and side faces 15e and 15f. The secondary heat exchanger 7 is set with the bottom face 15d of the casing 15 located on the converging portion 14a of the connecting member 14 and with the rear face 15b in plane contact with the connecting portion 14b thereof.

There is provided an inlet 20 at the rear face 15*b* of the casing 15. The inlet 20 is communicated with the opening 14*c* formed at the connecting portion 14*b* of the connecting member 14 with the secondary heat exchanger 7 set on the connecting member 14. Further, as shown in FIG. 3, there is provided a communicating opening 21 of a rectangular shape in an area X located on the top face 15*c* and nearer the front face 15*a* of the casing 15. In the water heater 1 of the present embodiment, the top face 15*c* of the casing 15 is at the same time a bottom face (upstream face) 9*b* of the exhaust portion 9 described below. Consequently, the communicating opening 21 functions as an outlet for exhausting combustion gas from the casing 15 of the secondary heat exchanger 7 and also as an inlet of combustion gas to the exhaust portion 9.

The heat receiving tubes 18 housed in the casing 15 are each of a metallic tubular shape and are arranged in parallel to each other with a gap enough to allow the combustion gas to pass between the tubes 18. The tubes 18 are housed within the casing 15 in such a manner that each tube 18 is folded back in substantially a U shape at substantially a central part in a longitudinal direction. Both ends of each tube 18 are located near the side face 15*e*, which has headers 16 and 17, to the header 16 one end of every tube 18 being connected and to the other header 17 the other end of every tube 18 being connected.

The header 16 has a water inlet 46, through which water is introduced into the secondary heat exchanger 7 from outside. Further, as shown in FIG. 1, a water plumbing 50 for supplying water from outside is connected to the water inlet 46. On the other hand, the header 17 has the water outlet 47 through which water having passed through the heat receiving tubes 18 located in the secondary heat exchanger 7 is discharged outside. Further, a connecting piping 51 is connected to the water outlet 47, so as to supply water that has undergone heat exchange in the secondary heat exchanger 7 through the piping 51 to the primary heat exchanger 3.

As shown in FIGS. 1 to 3, the exhaust portion 9 is located above the secondary heat exchanger 7, that is, downstream in a flowing direction of the combustion gas in relation to the secondary heat exchanger 7. The exhaust portion 9 is constituted by an exhaust portion-constituting body 25 mounted on the top face 15*c* of the casing 15 of the secondary heat exchanger 7. The exhaust portion-constituting body 25 defines faces other than the bottom face 9*b* of the exhaust portion 9 and is formed by a protruding portion 25*a* of substantially a rectangular shape from a front view and a flange 25*b* surrounding the protruding portion 25*a*. The protruding portion 25*a* is formed by a top face (downstream face) 9*a* and peripheral faces 9*c* to 9*f* surrounding an outer periphery of the top face 9*a*, thereby defining an internal space of the exhaust portion 9. The top face 9*a* is a face parallel to the bottom face 9*b* formed by the top face 15*c* of the casing 15 constituting the secondary heat exchanger 7 and has an exhaust opening 23 at its substantially central part. The flange 25*b* is a rectangular frame-like part continuous with the peripheral faces 9*c* to 9*f*. The exhaust portion-constituting body 25 is screwed to the top face 15*c* of the casing 15 with the peripheral face 9*c* facing to the front side of the water heater 1 and the peripheral face 9*e* facing to the rear side thereof, so as to be integrated with the secondary heat exchanger 7.

Figure 4A:
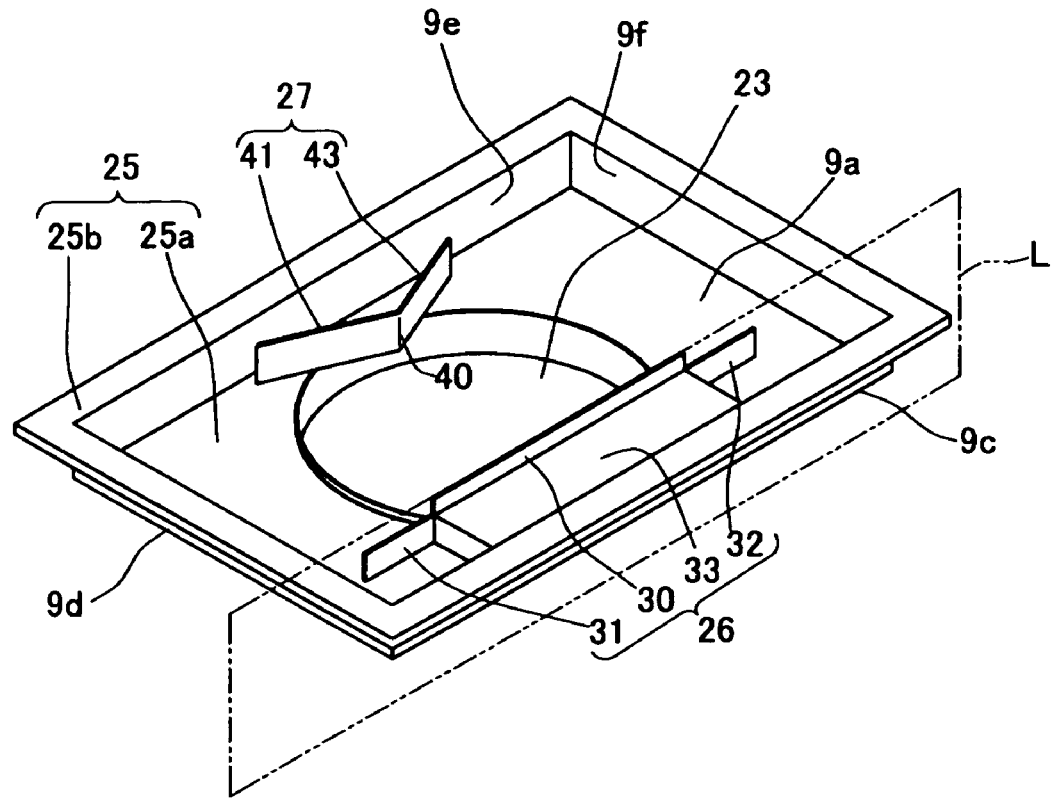
FIGS. 4A and 4B are perspective views each showing an internal structure of the exhaust portion, FIG. 4A being the view seen from a deflector with the exhaust portion reversed, and FIG. 4B being the view seen from a distribution board with the exhaust portion reversed.
Figure 4B:
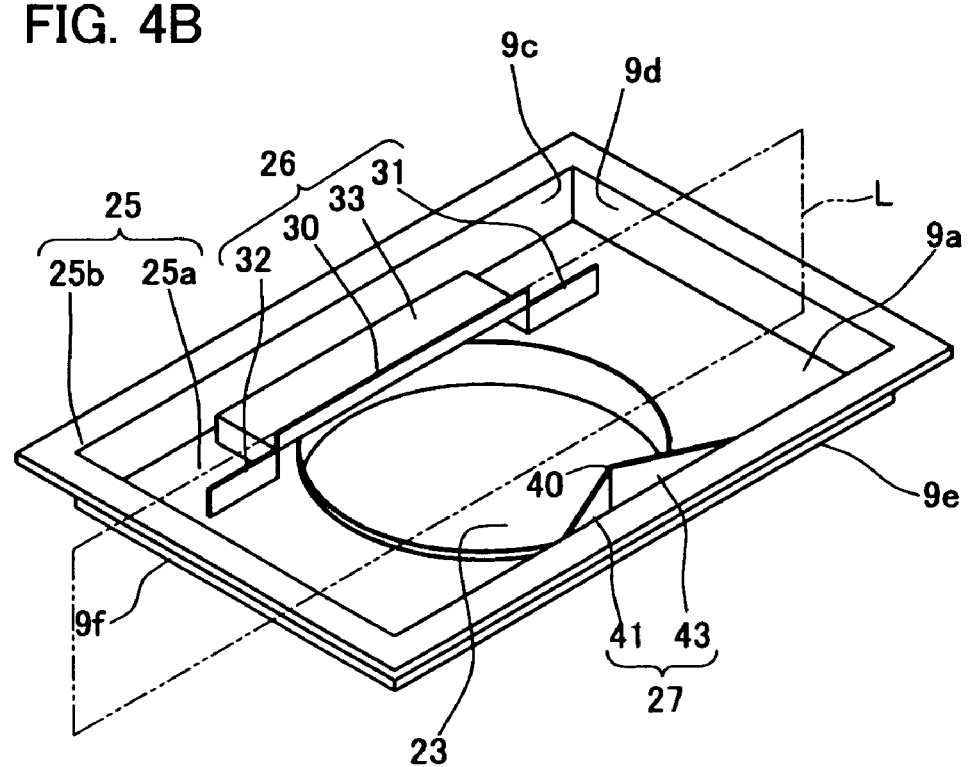

The exhaust portion-constituting body 25 includes a deflector (deflection means) 26 and a distribution board (distribution means) 27 within the protruding portion 25*a*. The deflector 26 is attached to a part located nearer the peripheral face 9*c* in the internal space of the exhaust portion 9. More specifically, as shown in FIGS. 4A and 4B, the deflector 26 has deflection boards (cross faces) 30 to 32 and a shielding portion 33. The deflector 26 is attached to the exhaust portion 9 with the deflection boards 30 to 32 each extending substantially vertically downward from the top face 9*a* to the bottom face 9*b*. The deflection boards 30 to 32 are juxtaposed in a linear manner at substantially regular intervals in relation to the peripheral face 9*c* of the exhaust portion 9 located at the front side. In other words, as shown in FIGS. 3 to 4B, the deflection boards 30 to 32 are located on a first imaginary plane L substantially parallel to the peripheral face 9*c*. Though the deflector 26 is mounted on the top face 9*a* in a cantilevered manner with no gap, the deflection boards 30 to 32 has a gap 35 between their lower ends and the bottom face 9*b*.

Figure 6A:
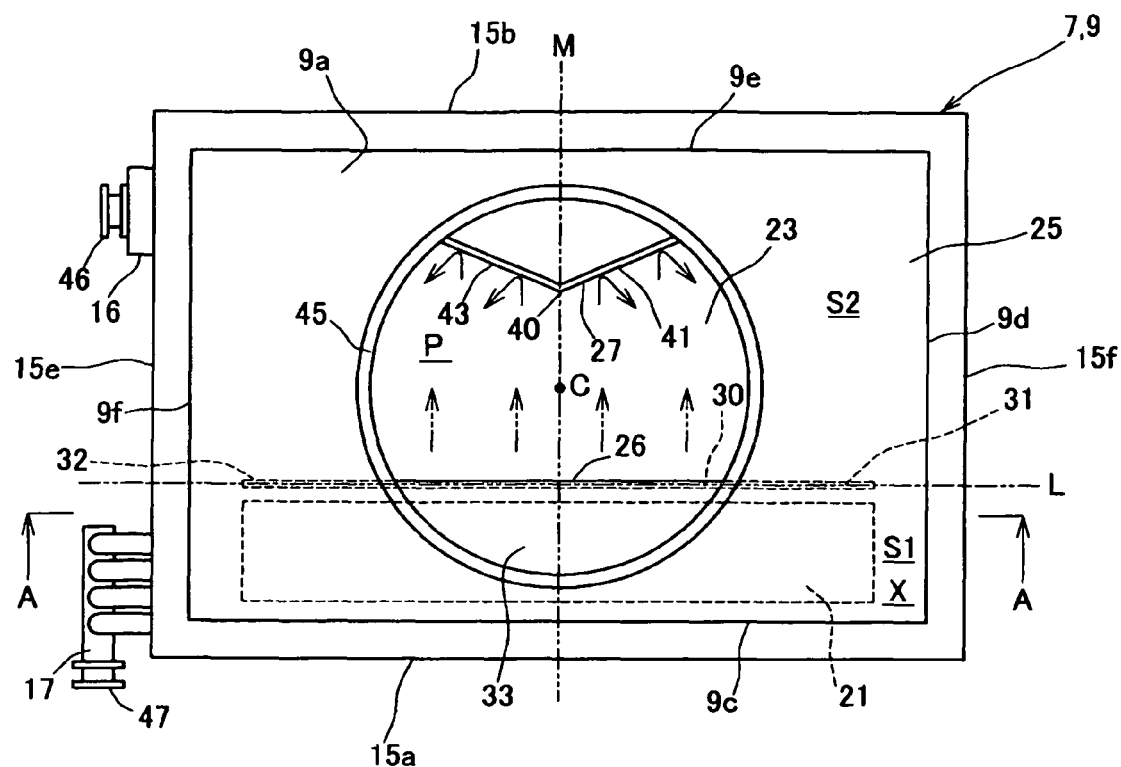
FIGS. 6A and 6B are views of the secondary heat exchanger and the exhaust portion, FIG. 6A being a plan view thereof, and FIG. 6B being a cross section taken along a line A-A of FIG. 6A.
Figure 6B:
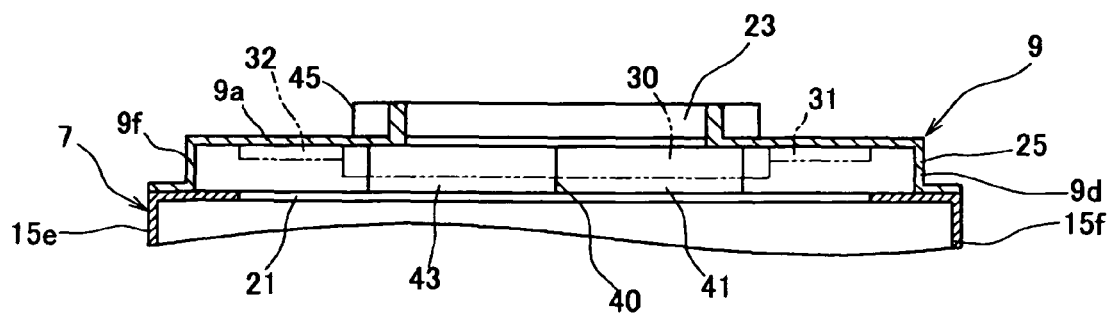

As shown in FIGS. 4A and 4B, the shielding portion 33 is formed continuous with the deflection board 30 located in a middle part in a longitudinal direction of the deflector 26, covering one part of an opening area of the exhaust opening 23 formed in the top face 9*a* within the exhaust part 9. More specifically, as shown in FIGS. 3, 6A and 6B, the shielding portion 33 extends inside the exhaust portion 9 so as to cover the one part (hereinafter referred to as a shielded part) of the exhaust opening 23, the one part being nearer the peripheral face 9*c* in relation to the above-mentioned first imaginary plane L. The shielding portion 33 is fixed to the top face 9*a* with substantially no gap as well as the deflection boards 31 and 32. Thereby, when combustion gas flows into the exhaust portion 9, the gas is prevented from being discharged out of the shielded part of the exhaust opening 23.

Referring to FIGS. 4A and 4B, the distribution board 27 is a belt-like plate bent in substantially an inverted obtuse V shape, having inclined surfaces 41 and 43 extending from a ridge 40 to both sides of the ridge 40. The distribution board 27 is mounted on the opposite side of the deflector 26, that is, on a position nearer the peripheral face 9*e* of the exhaust portion 9. More specifically, as shown in FIGS. 6A and 6B, the distribution board 27 is arranged in such a manner that the ridge 40 comes to a second imaginary plane M, which includes a central axis C of the opening area of the exhaust opening 23 and is perpendicular to the first imaginary plane L, and that the ridge 40 projects toward the deflector 26 as compared to the inclined surfaces 41 and 43. Further, the inclined surfaces 41 and 43 face to the deflector 26 and incline symmetrically with respect to the second imaginary plane M so as to be brought in closer to the peripheral face 9*e* located at the rear side of the water heater 1 as approaching the peripheral faces 9*d* and 9*f*, respectively.

The exhaust opening 23 has a rim, on which an annular connecting portion 45 projecting outside of the exhaust portion 9 is formed. As shown by two-dot chain line in FIG. 1, a discrete piping disposed for discharging combustion gas can be connected to the connecting portion 45.

Next, flows of combustion gas and water in the water heater 1 of the present embodiment will be described in detail, making reference to the drawings. Combustion gas generated by combustion of the burner 5 flows downstream in the combustion gas passage 8 in the shell 2, that is, upward in the figure. The high-temperature combustion gas having been generated by the burner 5 passes through the primary heat exchanger 3 disposed in the combustion gas passage 8, so as to heat water flowing within the primary heat exchanger 3. The combustion gas, from which sensible heat is mainly recovered in the primary heat exchanger 3, reaches the connecting member 14 disposed at the most downstream of the passage 8 to converge in the converging portion 14*a*.

Then, the combustion gas passes through the inlet 20 communicating with the opening 14*c* formed at the connecting portion 14*b* of the connecting member 14, flowing into the secondary heat exchanger 7. The combustion gas having been flowed into the secondary heat exchanger 7 flows among a number of the heat receiving tubes 18 disposed in the casing 15. At this time, latent heat contained in the combustion gas is mainly recovered by the water flowing in the tubes 18 in the secondary heat exchanger 7. Thereafter, the combustion gas reaches the communicating opening 21 formed on the top face 15c of the secondary heat exchanger 7, being discharged out of the casing 15.

On the other hand, the water having been supplied via the water plumbing 50 from outside flows into the heat receiving tubes 18 through the water inlet 46 and the header 16 of the secondary heat exchanger 7. The water having been flowed into the tubes 18, turning the flowing direction within the casing 15, flows toward the header 17 and is heated by heat exchange with the combustion gas flowing in the casing 15 in this period. When the water flowing in the tubes 18 reaches the water outlet 47 disposed in the header 17, the water is supplied to the primary heat exchanger 3 through the connecting piping 51 connected to the water outlet 47. In short, the water having been supplied from outside undergoes heat exchange in the secondary heat exchanger 7 first, thereafter being introduced into the primary heat exchanger 3. The water having been introduced into the primary heat exchanger 3 is heated by heat exchange with the high-temperature combustion gas flowing in the combustion gas passage 8, thereafter being supplied to a hot-water tap, a bathtub, a shower, or a load terminal (not shown) such as a heating device through the water outlet 11.

Figure 5:
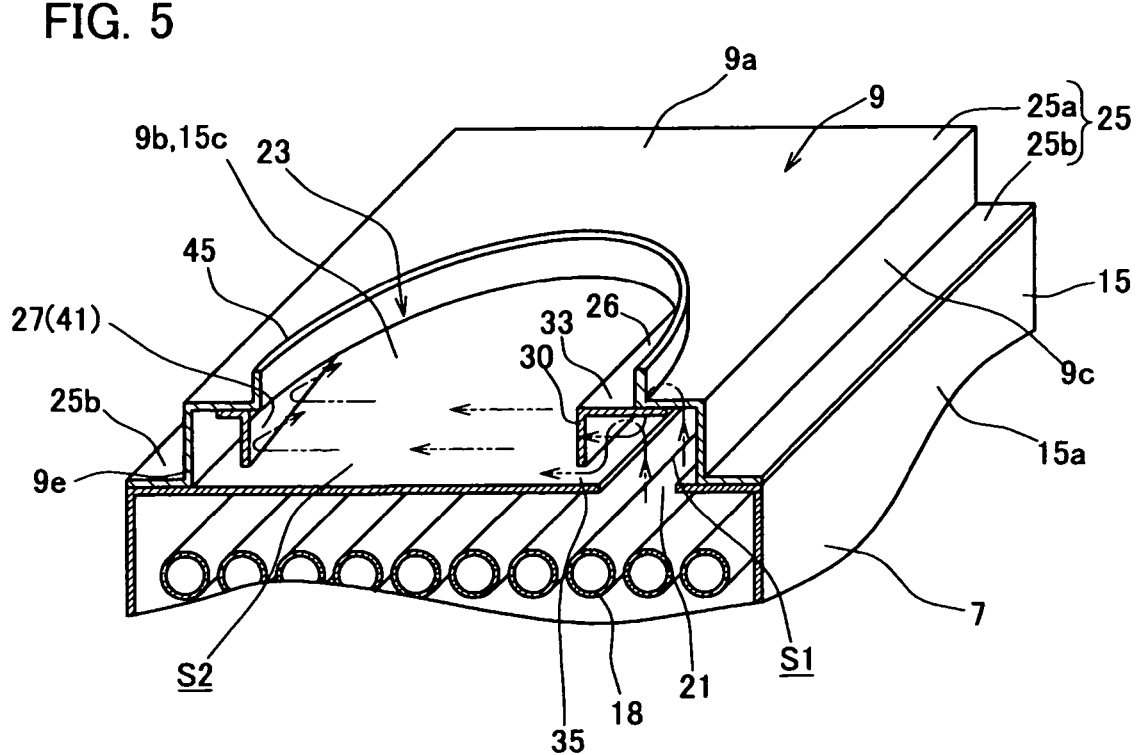
FIG. 5 is an enlarged cross-sectional perspective view of a relevant part of the secondary heat exchanger and the exhaust portion.

As for the flow of the combustion gas, as shown by arrows in FIG. 5, the combustion gas having passed through the primary heat exchanger 3 and the secondary heat exchanger 7 is discharged into the exhaust portion 9 through the communicating opening 21 formed on the top face 15c of the casing 15 constituting the secondary heat exchanger 7. Herein, in the present embodiment, the communicating opening 21 is opened in an imaginary space (hereinafter referred to as an inflow space S1) nearer the front side (toward peripheral face 9c) of the water heater 1 in relation to the first imaginary plane L where the deflection boards 30 to 32 of the deflector 26 are located. That is, the opening 21 does not open in an imaginary space (hereinafter referred to as outflow space S2) nearer the rear side (toward peripheral face 9e) of the water heater 1. Consequently, the combustion gas having been discharged through the secondary heat exchanger 7 flows upward through the communicating opening 21 from the secondary heat exchanger 7 located at a lower part, then flowing into the inflow space S1 in the exhaust portion 9.

Herein, though the gap 35 exists between the deflector 26, which is a boundary between the inflow space S1 and the outflow space S2, and the bottom face 9b of the exhaust portion 9, which is the top face 15c of the secondary heat exchanger, no gap exists between the deflector 26 and the top face 9a. Further, as shown in FIGS. 5, 6A and 6B, in the exhaust opening 23 formed in the top face 9a of the exhaust portion 9, the one part of the opening area corresponding to the inflow space S1 is shielded by the shielding portion 33 of the deflector 26. Therefore, as shown by arrows in FIGS. 5 and 6A, a flow of the combustion gas having been flowed from a lower part toward an upper part and into the inflow space S1 is deflected toward the rear side (peripheral face 9e) through the gap 35 formed adjacent to the bottom face 9b. That means, the flowing direction of the combustion gas flowing upward when the gas has been flowed into the secondary heat exchanger 7 is deflected into a direction along the bottom face 9b.

The combustion gas whose flowing direction has been deflected by passing through the gap 35 hits on the inclined surfaces 41 and 43 of the distribution board 27 disposed downstream in the flowing direction. Thereby, the flow of the combustion gas is distributed within the exhaust portion 9 as shown in arrows in FIGS. 5 and 6A, with the consequence that the combustion gas and drain are prevented from concentrating in one spot in the exhaust portion 9. More specifically, referring to FIG. 6A, the combustion gas hits on the inclined surfaces 41 and 43, whereby the flowing direction of the combustion gas is deflected in a direction away from an imaginary projection area P formed by projecting the opening area of the exhaust opening 23 formed in the top face 9a of the exhaust portion 9 onto the bottom face 9b. That allows the flow of the combustion gas to be distributed within the exhaust portion 9, thereby preventing the combustion gas and the drain from concentrating in the vicinity of the projection area P. Consequently, the combustion gas having been distributed in the exhaust portion 9 flows toward the top face 9a, then being discharged out of the exhaust portion 9 through the exhaust opening 23.

As described above, according to the water heater 1 of the present embodiment, the combustion gas having been flowed upward into the exhaust portion 9 through the communicating opening 21 formed in the inflow space S1 flows in a horizontal direction through the gap 35 existing between the deflection boards 30 to 32 and the bottom face 9b, then flowing into the outflow space S2. In short, according to the water heater 1, a flowing direction of combustion gas having been flowed into the exhaust portion 9 is deflected in a direction parallel to the top face 9a having the exhaust opening 23. That prevents the combustion gas having been flowed through the communicating opening 21 from directly flowing toward the exhaust opening 23 and drain from being discharged out of the exhaust portion 9 through the exhaust opening 23. Consequently, the water heater 1 inhibits inconvenience such as corrosion resulting from adhesion of drain in a part such as the connecting portion 45 of the exhaust portion 9 and a portion where an exhaust piping is connected thereto.

Herein, the above-mentioned embodiment illustrates such a configuration that a flowing direction of combustion gas is deflected by formation of a gap between the deflection boards 30 to 32 of the deflector 26 and the bottom face 9b of the exhaust portion 9, but the present invention is not limited thereto. More specifically, a flowing direction of combustion gas may be deflected by such an arrangement as a board placed above the communicating opening 21 and parallel to the top face 9a or the bottom face 9b.

As described above, in the exhaust portion 9, there is no gap between the shielding portion 33 of the deflector 26 and the top face 9a. Therefore, in the exhaust portion 9, the combustion gas just having been flowed into the inflow space S1 is forced to pass through the gap 35 existing between the deflection boards 30 to 32 and the bottom face 9b. Consequently, the above-mentioned configuration prevents the combustion gas having been flowed into the inflow space S1 from being led along the top face 9a up to the exhaust opening 23 entraining drain, thereby preventing the drain from being discharged out of the exhaust portion 9.

Herein, the above-mentioned embodiment illustrates such a configuration that no gap exists between the shielding portion 33 and the top face 9a, but the present invention is not limited thereto and a slight gap may exist there. Further, in a configuration of the arrangement of the board placed above the communicating opening 21 and parallel to the top face 9a or the bottom face 9b, it is also possible, as well as in the above-mentioned configuration, to prevent the combustion gas from being led along the top face 9a up to the exhaust opening 23 entraining drain by forming no gap between the board and the peripheral face 9c of the exhaust portion 9, thereby preventing the drain from being discharged out of the exhaust portion 9.

As described above, since the water heater 1 of the present invention is equipped with the distribution board 27, a flow of the combustion gas having been deflected by the deflector 26 is distributed by being hit on the distribution board 27. Consequently, the water heater 1 prevents the flow of combustion gas and drain from concentrating in the projection area P just beneath the exhaust opening 23, thereby preventing the drain from being discharged due to exhaust pressure of the combustion gas.

The above-mentioned configuration prevents drain from being discharged out of the exhaust portion 9 through the exhaust opening 23. Consequently, employment of the above-mentioned configuration allows reduction of the distance between the top face 9a and the bottom face 9b, which defines the exhaust portion 9, thereby reducing volumes of the exhaust portion 9 and the water heater 1. Even when a discrete exhaust piping is connected to the exhaust opening 23, it is also possible to prevent drain from adhering to a portion where the piping is connected to the piping and to protect members such as the exhaust piping from corrosion due to the resulting adhesion.

Herein, the above-mentioned embodiment illustrates such a configuration that the distribution board 27 is provided so as to prevent combustion gas and drain from concentrating into certain spot, but the present invention is not limited thereto. It is possible to employ such a configuration as dispensing with the distribution board 27 in the case that combustion gas and drain are unlikely to concentrate into certain spot or in the case that drain is unlikely to be discharged through the exhaust opening 23 even if combustion gas and drain concentrate into certain spot.

The above-mentioned embodiment illustrates an example employing the distribution board 27 made of a belt-like plate bent in substantially an inverted obtuse V shape and having the inclined surfaces 41 and 43 extending from the ridge 40 to both sides of the ridge 40, but the present invention is not limited thereto. Specifically, the distribution board 27 may be bent in a zigzag manner so as to have a plurality of ridges 40. Alternatively, instead of the distribution board 27, flat plates may be mounted in a similar position and in a similar direction to those of the inclined surfaces 41 and 43 of the distribution board 27. Further, the inclined surfaces 41 and 43 in the above-mentioned embodiment are constituted by a linearly-extending flat surface, but they may have a suitable shape such as a curved shape.

The above-mentioned embodiment illustrates such a configuration that combustion gas and drain having been flowed into the inflow space S1 are prevented from being directly discharged through the exhaust opening 23 by providing the shielding portion 33 in the deflector 26 so as to shield a part of the exhaust opening 23, but the present invention is not limited thereto. Specifically, it is possible to suitably adjust a position or an opening shape of the exhaust opening 23 so as not to make the exhaust opening 23 open toward the inflow space S1. Alternatively, instead of a member corresponding to the shielding portion 33 disposed in the deflector 26, another member like the shielding portion 33 capable of preventing combustion gas and drain from being discharged from the inflow space S1 may be provided.

The above-mentioned embodiment has the communicating opening 21 on the bottom face 9b of the exhaust portion 9 and the exhaust opening 23 on the top face 9a thereof, so as to deflect a flow of the combustion gas flowing from the bottom face 9b through the communicating opening 21 toward the top face 9a in a direction along the bottom face 9b by the deflector 26, but a positional relationship among the communicating opening 21, the exhaust opening 23, and the deflector 26 is not limited thereto. Specifically, a pair of opposing faces selected from vertically-extending faces like the peripheral faces 9c to 9f of the exhaust portion 9 may have a communicating opening 21 on one of the faces (corresponding to upstream face), and an exhaust opening 23 on the other of the faces (corresponding to downstream face) thereof. A member capable of, as well as the deflector 26, deflecting a flow of the combustion gas, which has been flowed through the communicating opening 21 into the exhaust portion 9, in a direction along the face corresponding to the above-mentioned upstream or downstream face may be incorporated in the exhaust portion 9.

The water heater 1 employs a fin-and-tube heat exchanger as the primary heat exchanger 3, but the present invention is not limited thereto and may employ a multitubular heat exchanger, which has a structure similar to the secondary heat exchanger 7, as the primary heat exchanger 3. Alternatively, it is possible to employ a multitubular heat exchanger as the primary heat exchanger 3 and another type of heat exchanger such as a plate-fin heat exchanger as the secondary heat exchanger 7. Further, though the secondary heat exchanger 7 is a multitubular heat exchanger of a so-called U-shaped tube type, whose heat receiving tubes 18 have each a U shape in appearance, the present invention is not limited thereto and may employ a multitubular heat exchanger of a straight tube type using straight tubes as the heat receiving tubes 18.

The invention claimed is:
1. A latent heat recovery-type water heater comprising:
a burner that generates a combustion gas;
a combustion gas passage in which the combustion gas flows;
a first heat exchanger disposed in the combustion gas passage and recovering mainly sensible heat contained in the combustion gas;
a second heat exchanger disposed downstream of the first heat exchanger in a flowing direction of the combustion gas and recovering mainly latent heat contained in the combustion gas; and
an exhaust portion disposed downstream of the second heat exchanger,
the exhaust portion being defined by an upstream face having an inlet of the combustion gas having been flowed through the second heat exchanger and a downstream face opposed to the upstream face and having an outlet of the combustion gas, and
the exhaust portion having a deflector disposed in a space formed between the upstream face and the downstream face so as to deflect a flow of the combustion gas having been flowed through the inlet in a direction along the upstream and downstream faces.
2. The water heater as defined in claim 1,
the deflector having at least one cross face perpendicular to the downstream face and extending from the downstream face toward the upstream face with a gap formed between the cross face and the upstream face,
the cross face dividing the exhaust portion into two imaginary parts, the inlet being formed in one of the parts, and
the outlet being formed in the other of the parts, so that the combustion gas is discharged through the outlet.

3. The water heater as defined in claim 1,
the deflector and the downstream face having no gap therebetween.

4. The water heater as defined in claim 1,
the exhaust portion further having a distributor disposed downstream in a flowing direction of the combustion gas having been deflected by the deflector so that the combustion gas having been flowed through the deflector is distributed in the exhaust portion.

5. The water heater as defined in claim 4,
the distributor having a ridge and inclined surfaces extending from the ridge to both sides of the ridge, and
the distributor being positioned so that the ridge projects toward the deflector.

6. The water heater as defined in claim 4,
the deflector having at least one cross face perpendicular to the downstream face and extending from the downstream face toward the upstream face,
the distributor having inclined surfaces opposed to the cross face and being inclined toward and away from the cross face,
so that the combustion gas makes a hit on the inclined surfaces, the hit deflecting a flowing direction of the combustion gas into a direction away from an imaginary projection area formed by projecting the opening area of the outlet onto the upstream face.

7. The water heater as defined in claim 1,
the upstream face being located above the downstream face,
the inlet being arranged so that the combustion gas having been discharged through the second heat exchanger is introduced upward with respect to the upstream face, and
the outlet being arranged so that the combustion gas existing in the exhaust portion is discharged upward with respect to the downstream face.

8. A latent heat recovery-type water heater comprising:
a burner that generates a combustion gas;
a combustion gas passage in which the combustion gas flows;
a first heat exchanger disposed in the combustion gas passage and recovering mainly sensible heat contained in the combustion gas;
a second heat exchanger disposed downstream of the first heat exchanger in a flowing direction of the combustion gas and recovering mainly latent heat contained in the combustion gas; and
an exhaust portion disposed downstream of the second heat exchanger,
the exhaust portion being defined by an upstream face having an inlet of the combustion gas having been flowed through the second heat exchanger and a downstream face located above the upstream face and having an outlet of the combustion gas,
the inlet being arranged so that the combustion gas having been discharged through the second heat exchanger is introduced upward with respect to the upstream face,
the outlet being arranged so that the combustion gas existing in the exhaust portion is discharged upward with respect to the downstream face, and
the exhaust portion having a deflector disposed in a space formed between the upstream face and the downstream face so as to deflect a flow of the combustion gas having been flowed through the inlet in a direction along the upstream and downstream faces.

9. The water heater as defined in claim 8,
the deflector having at least one cross face perpendicular to the downstream face and extending from the downstream face toward the upstream face with a gap formed between the cross face and the upstream face,
the cross face dividing the exhaust portion into two imaginary parts,
the inlet being formed in one of the parts, and
the outlet being formed in the other of the parts, so that the combustion gas is discharged through the outlet.

10. The water heater as defined in claim 8,
the deflector and the downstream face having no gap therebetween.

11. The water heater as defined in claim 8,
the exhaust portion further having a distributor disposed downstream in a flowing direction of the combustion gas having been deflected by the deflector so that the combustion gas having been flowed through the deflector is distributed in the exhaust portion.

12. The water heater as defined in claim 11,
the distributor having a ridge and inclined surfaces extending from the ridge to both sides of the ridge, and
the distributor being positioned so that the ridge projects toward the deflector.

13. The water heater as defined in claim 8,
the exhaust portion further having a distributor disposed downstream in a flowing direction of the combustion gas having been deflected by the deflector so that the combustion gas having been flowed through the deflector is distributed in the exhaust portion,
the deflector having at least one cross face perpendicular to the downstream face and extending from the downstream face toward the upstream face,
the distributor having inclined surfaces opposed to the cross face and being inclined toward and away from the cross face,
so that the combustion gas makes a hit on the inclined surfaces, the hit deflecting a flowing direction of the combustion gas into a direction away from an imaginary projection area formed by projecting the opening area of the outlet onto the upstream face.

14. A latent heat recovery-type water heater comprising:
a burner that generates a combustion gas;
a combustion gas passage in which the combustion gas flows;
a first heat exchanger disposed in the combustion gas passage and recovering mainly sensible heat contained in the combustion gas;
a second heat exchanger disposed downstream of the first heat exchanger in a flowing direction of the combustion gas and recovering mainly latent heat contained in the combustion gas; and
an exhaust portion disposed downstream of the second heat exchanger,
the exhaust portion being defined by an upstream face having an inlet of the combustion gas having been flowed through the second heat exchanger and a downstream face located above the upstream face and having an outlet of the combustion gas,
the exhaust portion having a deflector disposed in a space formed between the upstream face and the downstream face so as to deflect a flow of the combustion gas having been flowed through the inlet in a direction along the upstream and downstream faces, the exhaust portion further having a distributor disposed downstream in a flowing direction of the combustion gas having been deflected by the deflector so that the combustion gas flowing through the deflector is distributed in the exhaust portion, the deflector having at least one cross face perpendicular to the downstream face and extending from the downstream face toward the upstream face with a gap formed between the cross face and the upstream face, the cross face dividing the exhaust portion into two imaginary parts, the inlet being formed in one of the parts, and the outlet being formed in the other of the parts, so that the combustion gas is discharged through the outlet.

15. The water heater as defined in claim 14,
the deflector and the downstream face having no gap therebetween.

16. The water heater as defined in claim 14,
the distributor having a ridge and inclined surfaces extending from the ridge to both sides of the ridge, and
the distributor being positioned so that the ridge projects toward the deflector.

17. The water heater as defined in claim 14,
the deflector having at least one cross face perpendicular to the downstream face and extending from the downstream face toward the upstream face,
the distributor having inclined surfaces opposed to the cross face and being inclined toward and away from the cross face,
so that the combustion gas makes a hit on the inclined surfaces, the hit deflecting a flowing direction of the combustion gas into a direction away from an imaginary projection area formed by projecting the opening area of the outlet onto the upstream face.

18. The water heater as defined in claim 14,
the upstream face being located above the downstream face,
the inlet being arranged so that the combustion gas having been discharged through the second heat exchanger is introduced upward with respect to the upstream face, and
the outlet being arranged so that the combustion gas existing in the exhaust portion is discharged upward with respect to the downstream face.

* * * * *